United States Patent
Rozsa et al.

(10) Patent No.: US 10,168,598 B2
(45) Date of Patent: Jan. 1, 2019

(54) METHOD FOR SCANNING ALONG A CONTINUOUS SCANNING TRAJECTORY WITH A SCANNER SYSTEM

(75) Inventors: Balazs Rozsa, Budapest (HU); Gergely Katona, Budapest (HU); Mate Veress, Budapest (HU); Pal Maak, Budapest (HU); Gergely Szalay, Budapest (HU); Attila Kaszas, Budapest (HU); Balazs Chiovini, Kecskemet (HU); Peter Matyas, Budapest (HU)

(73) Assignee: Femtonics Kft., Budapest (HU)

( * ) Notice: Subject to any disclaimer, the term of this patent is extended or adjusted under 35 U.S.C. 154(b) by 718 days.

(21) Appl. No.: 14/368,932

(22) PCT Filed: Jan. 5, 2012

(86) PCT No.: PCT/HU2012/000001
§ 371 (c)(1),
(2), (4) Date: Oct. 6, 2014

(87) PCT Pub. No.: WO2013/102771
PCT Pub. Date: Jul. 11, 2013

(65) Prior Publication Data
US 2015/0085346 A1    Mar. 26, 2015

(51) Int. Cl.
*G02F 1/33*    (2006.01)
*G02B 26/10*   (2006.01)
*G02B 21/00*   (2006.01)
*G02F 1/29*    (2006.01)

(52) U.S. Cl.
CPC ............ *G02F 1/332* (2013.01); *G02B 21/004* (2013.01); *G02B 26/101* (2013.01); *G02F 1/33* (2013.01); *G02F 2001/291* (2013.01); *G02F 2201/16* (2013.01)

(58) Field of Classification Search
CPC ...... G02F 1/332; G02F 1/33; G02F 2001/291; G02F 2201/16; G02B 21/004; G02B 26/101
USPC ......................................... 359/310
See application file for complete search history.

(56) References Cited

U.S. PATENT DOCUMENTS

2010/0328759 A1* 12/2010 Kirkby ............... G01N 21/6458
359/310

OTHER PUBLICATIONS

Kaplan et al. (Acousto-optic lens with very fast focus scanning, Optics Letters, vol. 26 No. 14, Jul. 2001, pp. 1078-1080).*

* cited by examiner

*Primary Examiner* — Jie Lei
*Assistant Examiner* — Mitchell Oestreich
(74) *Attorney, Agent, or Firm* — Olson & Cepuritis, Ltd.

(57) ABSTRACT

The invention relates to a method for scanning along a continuous scanning trajectory with a scanner system (100) comprising a first pair of acousto-optic deflectors (10) for deflecting a focal spot of an electromagnetic beam generated by a consecutive lens system (200) defining an optical axis (z) in an x-z plane, and a second pair of acousto-optic deflectors (20) for deflecting the focal spot in a y-z plane being substantially perpendicular to the x-z plane, characterized by changing the acoustic frequency sweeps with time continuously in the deflectors (12, 12') of the first pair of deflectors (10) and in the deflectors (22, 22') of the second pair of deflectors (20) so as to cause the focal spot to move continuously along the scanning trajectory.

5 Claims, 2 Drawing Sheets

PRIOR ART

METHOD FOR SCANNING ALONG A CONTINUOUS SCANNING TRAJECTORY WITH A SCANNER SYSTEM

CROSS-REFERENCE TO RELATED APPLICATIONS

This application is a U.S. National Phase of PCT/HU2012/000001, filed Jan. 5, 2012, which is incorporated herein by reference.

The present invention relates to a method for scanning along a continuous scanning trajectory with a scanner system comprising a first pair of acousto-optic deflectors for deflecting a focal spot of an electromagnetic beam traversing a consecutive lens system defining an optical axis (z) in an x-z plane, and a second pair of acousto-optic deflectors for deflecting the focal spot in a y-z plane being substantially perpendicular to the x-z plane.

Three-dimensional (3D) laser scanning technologies have great importance in performing measurements on biological specimens (including scanning, imaging, detection, excitation, etc.).

State of the art technologies commonly apply two-photon laser scanning microscopes that use a laser light of lower photon energy of which two photons are needed to excite a fluorophore in a quantum event, resulting in the emission of a fluorescence photon, which is then detected by a detector. The probability of a near simultaneous absorption of two photons is extremely low requiring a high flux of excitation photons, thus two-photon excitation practically only occurs in the focal spot of the laser beam, where the beam intensity overcomes the two-photon threshold. The photon number is increased also by mode-locking the excitation laser causing photons to arrive in high intensity bounces at the sample. Generally a femtosecond pulsed laser is used to provide the required photon flux for the two-photon excitation, while keeping the average laser beam intensity sufficiently low to avoid thermal sample deterioration.

In the case of analysing biological specimens it is generally preferred to move the focus spot of the laser beam instead of moving the specimen, which would be difficult to carry out when using submerge specimen chambers or when electrical recording is performed on the biological specimen with microelectrodes. Moving the focus spot along an arbitrary trajectory can be achieved by deflecting the laser beam to scan different points in a focal plane (x-y plane) and by displacing the objective along its optical axis (axis z) e.g. via a piezo-positioner in order to change the depth of the focal plane. XY scanning is conventionally achieved by deflecting the laser beam within a given focal plane (x-y plane) via mechano-optical deflecting means such as deflecting mirrors mounted on galvanometric scanners.

The inertia of the mechanical scanning components (i.e. the scanning mirrors and the microscope objective) presents certain limitations with regard to the achievable scanning speed, since the scanning components need to be physically displaced in order to perform 3D scanning.

Rapid acousto-optic deflectors (deflector) have been proposed as an alternative to the conventional mechano-optic solutions.

Kaplan et al. ("Acousto-optic lens with very fast focus scanning", OPTICS LETTERS/Vol. 26, No. 14/Jul. 15, (2001)) proposed an acousto-optic lens made up of two deflectors with counter propagating acoustic waves locked in phase, to achieve purely focal plane shift along the z axis without lateral moving of the beam. In this type of application chirped frequency acoustic waves should be generated, i.e. the frequency of the acoustic wave in the acousto-optic medium of the deflectors is continuously changed. Changing the focus of the acousto-optic lens is achieved by changing the sweep rate of the acoustic frequencies through the optical aperture of the acousto-optic devices. To simultaneously move the beam and change the focal plane the sweep rates have to be changed and acoustic frequency difference between the two deflectors of a pair should be introduced. To move the focal spot along the x axis acoustic frequency difference between the deflectors deflecting in the x-z plane, to move along the y axis, acoustic frequency difference between the deflectors of the pair deflecting in the y-z plane should be applied. The amount of the frequency difference in the respective pairs determines the x and y coordinates of the spot.

The above principle is used in acousto-optic scanners in order to provide 3D scanning. In an acousto-optic scanner four deflectors are used to achieve true 3D scanning—i.e. focusing the exciting laser beam to points within a diamond like spatial volume as described in U.S. Pat. No. 7,227,127. In normal operation, random access scanning is used, that means that any selected point in the 3D space can be addressed by adding proper control to the acousto-optic deflectors. This mode is called random access multipoint scanning (RAMP).

For the RAMP operation in 3D the deflectors should be filled with chirped acoustic waves that change their frequencies linearly with time, with nearly equal frequency sweep rate, but different starting frequency. The slope of the chirps determines focal depth (z level) whereas the difference between the instant frequencies present in the members of the deflector pairs deflecting in the x-z or y-z planes, respectively, gives the lateral distance x and y of the focal spot, relative to the axis.

The frequency functions in the members of the pair deflecting e.g. in the x-z plane can be defined as $$f_{1x}=f_{10x}+a_{1x} \cdot t, f_{2x}=f_{20x}+a_{2x} \cdot t$$

In the RAMP operation the z level is controlled (kept constant) by keeping the amount of $a_{1x}$ and $a_{2x}$ equal ($a_{1x}=a_{2x}$) from which it follows that the x level is determined by: $f_{2x}-f_{1x}=f_{20x}-f_{10x}$. In prior art acousto-optic scanners the values $a_{1x}$ and $a_{2x}$ are kept equal in order to form a stable focus spot in a desired spatial location. The switching time between two different spatial points in RAMP mode is determined by the acoustic velocity, since the new acoustic waves must fill the optical aperture of the deflectors completely. If the aperture has a width D across the sound, the time needed to fill the acousto-optic medium with the new acoustic wave of velocity $v_{ac}$ is: $t_{sw}=D/v_{ac}$. (In acoustically rotated $TeO_2$ deflector configuration this time is 21 μs for an aperture of 15 mm).

One of the problems associated with the conventional RAMP mode is that it is not possible to conduct measurements during the switching time because the discrete change of the frequency results in the spot spreading out in space, whereby multi-photon excitation does not occur any more.

It is an object of the present invention to overcome the problems associated with the prior art. In particular, it is an object of the invention to eliminate the switching time associated with the RAMP mode of acousto-optic deflectors and to provide a new operating mode for moving the focus spot continuously along an arbitrary scanning trajectory (curve).

The inventors have realised that if the slopes in the two deflectors in an x-z or y-z pair are not kept equal, but instead varied in time, then it is possible to move the focal spot along trajectories (curves) in 2D and 3D.

The above objects are achieved by the method according to claim 1.

Particularly advantageous embodiments of the inventive method are defined in the attached dependent claims.

With the inventive method it is not necessary to wait until the new frequencies fill the optical aperture, since if the frequency differences change continuously in time, this causes the spot to move along neighbouring points, without the need for "jumping" from one measurement point to another, that would spread out the spot in space. The inventors have recognized and demonstrated theoretically and experimentally that the point spread function PSF of the focal spot is not distorted only by the fact that it is moving. Appropriate control of the acousto-optic devices, on the other hand, can be achieved by suitable electronic driver and controlling software.

Further details of the invention will be apparent from the accompanying figures and exemplary embodiments.

Figure 1:
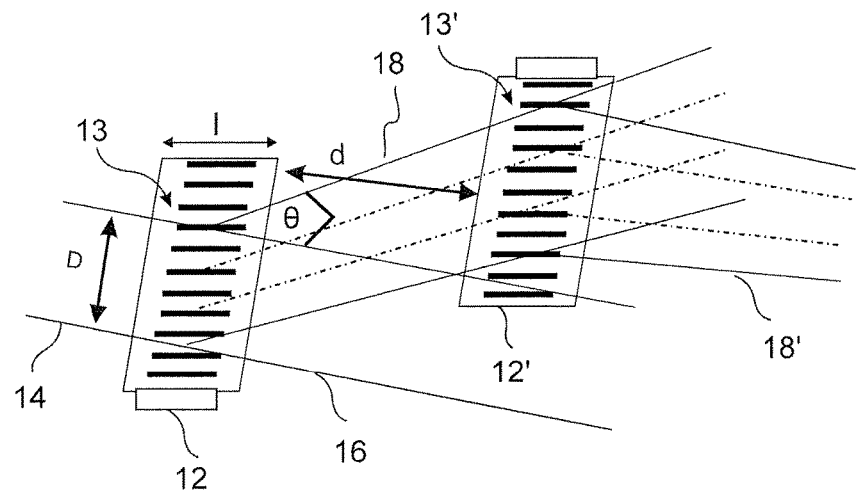
FIG. 1 is a schematic illustration of the basics of beam deflection via a pair of acousto-optic deflectors.

FIG. 1 is a schematic illustration of the basics of beam deflection via a pair of acousto-optic deflectors 10 comprising a first deflector 12 and a second deflector 12' having counter propagating acoustic waves 13 and 13' for performing scanning in the x-z plane in a known way. The crystal lattice constants of the crystal making up the deflector 12, 12' are slightly modified by the acoustic waves propagating there through, whereby the deflector crystals act as thick optical gratings of modifiable grating constant.

Accordingly, an incident electromagnetic beam 14 (generally a laser beam) is split by the first deflector 12 into an undeflected zero order beam 16, a first order deflected beam 18 and higher order deflected beams which are neglected in the following discussion as generally only the first order beam 16 is of interest. The first order beam 18' deflected (diffracted) by the second deflector 12' will have the same direction as the incident beam 14 and consequently as the zero order beam 16 deflected by the first deflector 12. Therefore this zero order beam 16 must be separated from the twice diffracted first order beam 18' exiting the second deflector 12'. There are two commonly applied technologies for separating the zero order beam 16. If the deflectors 12, 12' are made up of anisotropic crystals and use anisotropic Bragg diffraction involving slow shear acoustic waves the polarisation of the first order diffracted beam 18 is rotated by 90 degrees compared to the undiffracted zero order beam 16, thus the zero order beam 16 may simply be filtered out via a polarising filter. According to the second technology the twice diffracted first order beam 18' and the zero order beam 16 are separated spatially: the spacing d between the two deflectors 12, 12' must be greater than that predicted by the beam aperture D of the first deflector 12 and the first order diffraction angle θ. In practice the required d spacing is approximately d=10*D. This imposes that the two counter-propagating acoustic beams cannot be realized within the same deflector.

Figure 2:
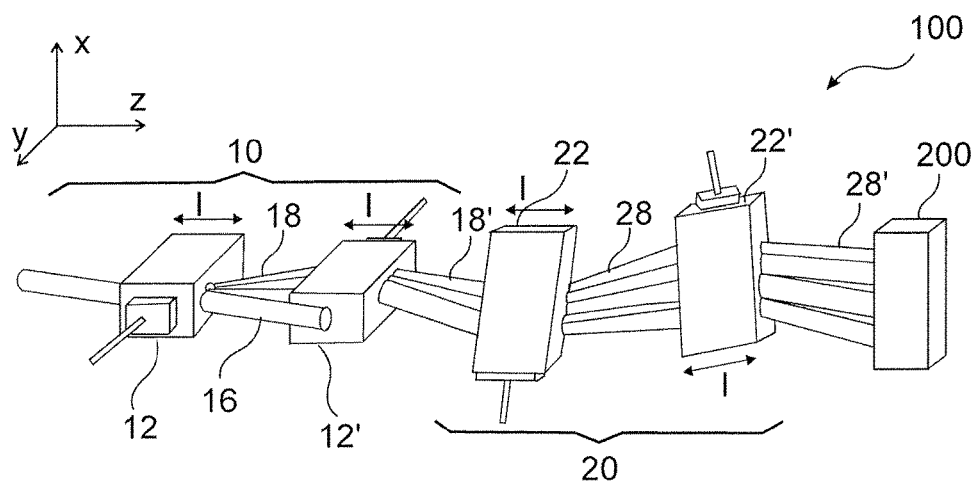
FIG. 2 is a schematic illustration of a prior art scanning system comprising two consecutive pairs of deflectors focusing in the x-z and y-z planes.

FIG. 2 illustrates a prior art scanning system 100 comprising two consecutive pairs of deflectors 10 and 20. The first pair 10 (comprises a first and a second deflector 12, 12' provided for focusing in the x-z plane, while the second pair 20 ( ) comprises a third and a fourth deflector 22, 22' being provided for focusing in the y-z plane.

Figure 3:
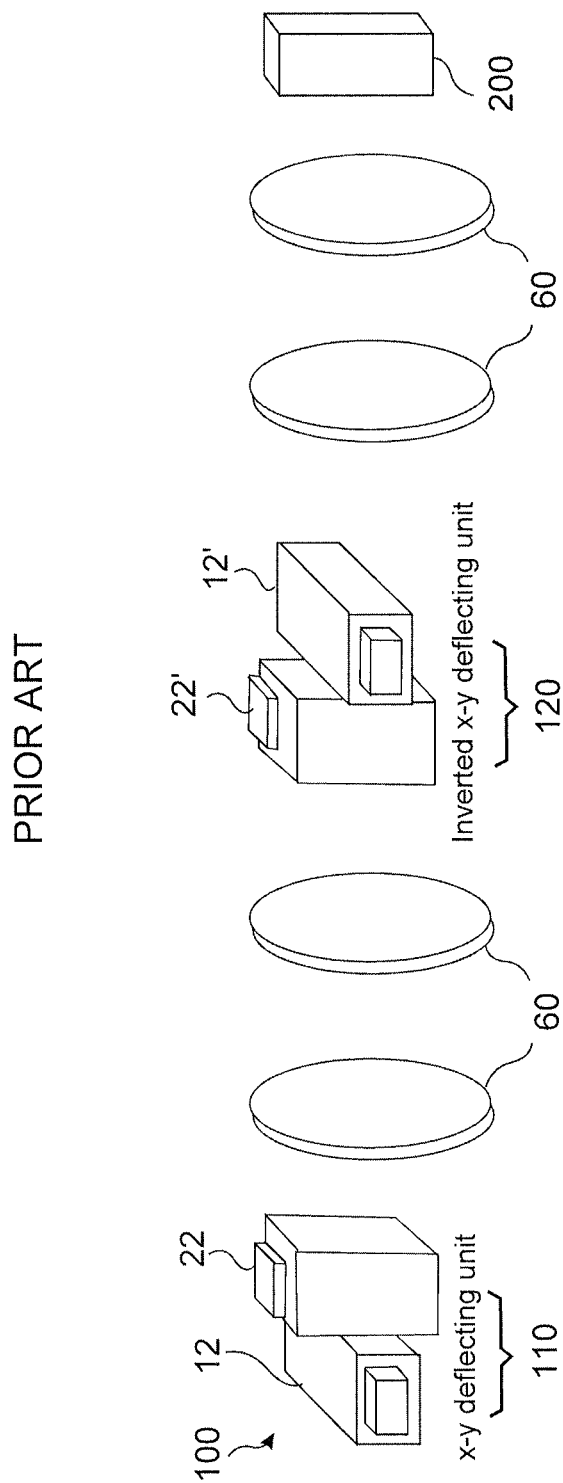
FIG. 3 is a schematic illustration of another prior art scanning system.

FIG. 3 illustrates a prior art scanning system 100 containing a different arrangement of deflectors. The deflectors 12, 12' and 22, 22' are now grouped in two consecutive pairs 110 and 120, a drift compensating unit and a z-focusing unit. Both pairs 110 and 120 contain a deflector 12, 12' operating in the x-z plane and a deflector 22, 22' operating in the y-z plane. The two deflector pairs 110, 120 are linked optically with a telecentric imaging system 60. The scanning system 100 is further imaged to the back aperture of an objective or similar lens system 200 via a second telecentric imaging system 60.

In order to compensate for different types of optical aberrations various scanning systems 100 have been proposed as discussed in detail in WO2010076579.

The present invention can be applied in any prior art scanner comprising two pairs of acousto-optic deflectors and in particular with any of acousto-optic deflector systems disclosed in WO2010/076579 The inventive method is suitable for increasing the speed of acousto-optic scanning in two-photon microscope technology and allows both for scanning in 2D (along segments within a given focal plane, i.e. where the z coordinate is constant), and for scanning in 3D (along an arbitrary 3D trajectory within the sample).

The frequency functions in the deflectors 12, 12' of the pair 10 deflecting in the x-z plane can be defined as $$f_{1x}=f_{10x}+a_{1x} \cdot t, f_{2x}=f_{20x}+a_{2x} \cdot t$$

Similarly the frequency functions for the deflectors 22, 22' of the pair 20 deflecting in the y-z plane is:

$$f_{1y}=f_{10y}+a_{1y} \cdot t, f_{2y}=f_{20y}+a_{2y} \cdot t$$

2D Scanning

In the more simple embodiment line scans are made possible in 2D by keeping the z coordinate constant and changing only the x and y coordinates. In this case it is possible to make use of the slope mismatch between the acoustic frequency sweeps (i.e. $a_{1x}$ is not equal to $a_{2x}$ as in the RAMP operation mode) within the consecutive acousto-optic deflectors 12, 12', or 22, 22' deflecting in the x-z or y-z plane. The velocity of the scanning in a given plane can be set by nearly symmetrically increasing the mismatch between the slopes of the deflectors in the deflector pairs 10 and 20 respectively: this means that $a_{1x}-a_{2x}$, $a_{1y}-a_{2y}$ is no longer zero. If the deflectors 12 and 12' of the first pair 10 are identical, and the deflectors 22 and 22' of the second pair 20 are identical as well, the $v_x$ and $v_y$ velocity of the deflected focus spot does not change, if the slopes in the two deflectors 12, 12' and 22, 22' of a pair 10 and 20 are shifted symmetrically to maintain:

$$\Delta a_x = a_{1x}-a_{2x} = \text{const, and } \Delta a_y = a_{1y}-a_{2y} = \text{const.}$$

Hence $a_{1x}$ and $a_{2x}$ and $a_{1y}$ and $a_{2y}$ can be chosen as:

$$a_{1x}=a_{10x}+\Delta a_x \text{ and } a_{2x}=a_{10x}-\Delta a_x$$

$$a_{1y}=a_{10y}+\Delta a_y \text{ and } a_{2y}=a_{10y}-\Delta a_y.$$

If the deflectors 12, 12' and 22, 22' respectively are not identical, then the following equations can be used.

If the frequency sweeps responsible for the deflection in the x-z plane have the slopes $a_{1x}$ and $a_{2x}$, respectively, than the focal spot will move in the measurement plane along the x axis with the velocity:

$$v_x=(K_2(\lambda)a_{2x}-K_1(\lambda)a_{1x}) \cdot f_{obj}/M$$

where $K(\lambda)$ is the dependence of the deflection angle $\theta$ on the acoustic frequency f in a given deflector: $\theta=K(\lambda)f$, $\lambda$ being the optical wavelength. The first and second deflectors of a pair may be of different configuration and geometry, therefore $K_1$ and $K_2$ are different. M is the magnification of the optical system between the scanner 100 and the objective 200 and $f_{obj}$ is the effective focal length of the objective, or of any lens system used as an objective 200. The same is valid for the y-z plane:

$$v_y = (K_2(\lambda)a_{2y} - K_1(\lambda)a_{1y}) \cdot f_{obj}/M$$

Thus by setting the two velocities both arbitrary drift directions in a given focal plane can be adjusted.

Simulations have shown that the spot itself does not change its parameters significantly during the drift, the Strehl ratio only decreases with the distance from the optimum point (from the middle of the scanned volume) according to the rule valid for stationary focal spots.

The sweep slope mismatch is optimized for minimum astigmatism in any $z \neq 0$ plane, to obtain the best spot size and shape. The minimum astigmatism restriction causes difference in the frequency slopes of the x deflecting and y deflecting deflector pairs: $a_{1x}$ and $a_{2x}$ as well as $a_{1y}$ and $a_{2y}$ set for the x-z and y-z planes respectively. We use a quite simple method in the algorithm that determines the frequency sweep slopes, which cause the spot to move in a plane at a predetermined z in the wanted direction with a wanted velocity v.

In the scanning system 100 depicted in FIG. 3, the drift compensating unit's 110 deflectors 12 and 22 are imaged onto the deflectors 22' and 12' of the scanner unit 120. The design of the optical system was made for zero astigmatism in the nominal focal plane of the microscope incorporating the scanning system 100, the astigmatism would increase nearly linearly with the $\Delta z$ distance from this plane, if the slope values in the x and y deflectors would be equal. These are set however for zero or nearly zero astigmatism for any z=const plane, by experimentally selecting the slopes of each deflector to get the best possible focal spot PSF over the whole scanned volume. The zero astigmatism condition is $z_x=z_y$. The z value in the x-z or y-z plane can be determined directly from the slopes in the respective deflectors:

$$z_x = \frac{M_x^2 f_{obj}(v_{ac}/(K_{1x}a_{1x}+K_{2x}a_{2x}))}{M_x^2(v_{ac}/(K_{1x}a_{1x}+K_{2x}a_{2x}))+f_{obj}},$$

$$z_y = \frac{M_y^2 f_{obj}(v_{ac}/(K_{1y}a_{1y}+K_{2y}a_{2y}))}{M_y^2(v_{ac}/(K_{1y}a_{1y}+K_{2y}a_{2y}))+f_{obj}}$$

where $M_x$ and $M_y$ are the magnifications of the telecentric system linking the scanning system 100 and the objective 200 in the respective planes.

The slope differences $\Delta a_x = a_{1x} - a_{2x}$, $\Delta a_y = a_{1y} - a_{2y}$ between the two deflectors 12, 12' and 22, 22' deflecting in the same direction x or y, respectively, are set by the desired spot drift parameters: direction and velocity. The direction can be defined as the angle $\alpha$ of the drift direction with respect the x axis. A given direction a and given velocity v can be set by the slope differences determined as:

$$K_{2x}(\lambda)a_{2x} - K_{1x}(\lambda)a_{1x} = \frac{v \cdot \cos(\alpha) \cdot M_x}{f_{obj}},$$

-continued $$K_{2y}(\lambda)a_{2y} - K_{1y}(\lambda)a_{1y} = \frac{v \cdot \sin(\alpha) \cdot M_y}{f_{obj}}.$$

The z level of the plane does not change, if the slopes in the two deflectors (12, 12' and 22, 22') of a pair (10 and 20) are shifted symmetrically to maintain $K_{2x}(\lambda)a_{2x} + K_{1x}(\lambda)a_{1x} = \text{const}$ and $K_{2y}(\lambda)a_{2y} + K_{1y}(\lambda)a_{1y} = \text{const}$.

3D Scanning

When we do not use linear chirps, instead we use non-linear chirps, and in the same time do not maintain symmetric shift in the slopes of the different deflectors, we can in principle achieve scanning along arbitrary 3D path, given by the function $z=f(x,y)$, x,y,z being the Cartesian coordinates of the sample volume, e.g. with the origin at the point defined by intersection of the optical axis z and the nominal focal plane of the objective. The basic equations for the velocities using the well known $a_{1x}$ etc slope values are:

$$v_{z_x} = 2M_x f_{obj} \frac{K_{2x}K_{1x}(\dot{a}_{2x}a_{1x} - \dot{a}_{1x}a_{2x})}{[M_x(K_{2x}a_{2x}-K_{1x}a_{1x})+(K_{2x}a_{2x}-K_{1x}a_{1x})]^2}$$

$$v_{z_y} = 2M_y f_{obj} \frac{K_{2y}K_{1y}(\dot{a}_{2y}a_{1y} - \dot{a}_{1y}a_{2y})}{[M_y(K_{2y}a_{2y}-K_{1y}a_{1y})+(K_{2y}a_{2y}-K_{1y}a_{1y})]^2}$$

But to have the spot not spread out in space $z_x = z_y$ and $v_{zx} = v_{zy}$ must always be fulfilled. These give restrictions on the possible values of the slopes and their temporal derivatives, $\dot{a}_{1x}$, $\dot{a}_{2x}$ etc.:

$$M_x \frac{K_{2x}a_{2x}-K_{1x}a_{1x}}{K_{2x}a_{2x}+K_{1x}a_{1x}} = M_y \frac{K_{2y}a_{2y}-K_{1y}a_{1y}}{K_{2y}a_{2y}+K_{1y}a_{1y}} \text{ and}$$

$$2M_x f_{obj} \frac{K_{2x}K_{1x}(\dot{a}_{2x}a_{1x} - \dot{a}_{1x}a_{2x})}{[M_x(K_{2x}a_{2x}-K_{1x}a_{1x})+(K_{2x}a_{2x}-K_{1x}a_{1x})]^2} =$$

$$2M_y f_{obj} \frac{K_{2y}K_{1y}(\dot{a}_{2y}a_{1y} - \dot{a}_{1y}a_{2y})}{[M_y(K_{2y}a_{2y}-K_{1y}a_{1y})+(K_{2y}a_{2y}-K_{1y}a_{1y})]^2}$$

The coordinate z can be generally expressed as:

$$z = f_{obj} - \frac{f_{obj}}{M_x \frac{K_{2x}a_{2x}-K_{1x}a_{1x}}{K_{2x}a_{2x}+K_{1x}a_{1x}}+1} = f_{obj} - \frac{f_{obj}}{M_y \frac{K_{2y}a_{2y}-K_{1y}a_{1y}}{K_{2y}a_{2y}+K_{1y}a_{1y}}+1}$$

EXAMPLE 1

In an exemplary setting $a_{1x}$ and $a_{2x}$ are controlled according to the equations:

$$a_{1x} = b_{1x}t + c_{1x}, \text{ and } a_{2x} = b_{2x}t.$$

In this case:

$$\dot{a}_{1x} = b_{1x}, \dot{a}_{2x} = b_{2x},$$

Furthermore, taking a scanning system 100 wherein the deflectors 12, 12' are identical: $K_{1x} = K_{2x} = K_x$ thus:

$$z_x = f_{obj} - \frac{f_{obj}}{M_x \frac{(b_{1x} - b_{2x})t + c_{1x}}{(b_{1x} + b_{2x})t + c_{1x}} + 1},$$

$$v_{z_x} = 2M_x f_{obj} \frac{c_{1x}b_{2x}}{[M_x(b_{1x}t - b_{2x}t + c_{1x}) + (b_{2x}t + b_{1x}t + c_{1x})]^2}.$$

Using these values the frequencies in a given deflector pair 10, e.g. x are:

$$f_{1x} = f_{10x} + b_{1x}t^2 + c_{1x}t, \text{ and } f_{2x} = f_{20x} + b_{2x}t^2$$

With these the x coordinate can be determined:

$$x = f_{obj} K_x M_x ((b_{1x} - b_{2x})t^2 + c_{1x}t + (f_{10x} - f_{20x})).$$

The above considerations can be applied for controlling the y direction scanning similarly:

$$a_{1y} = b_{1y}t + c_{1y}, \text{ and } a_{2y}t \text{ and } K_{1y} = K_{2y} = K_y$$

from which the y coordinate can be determined in the same manner:

$$y = f_{obj} K_y M_y ((b_{1y} - b_{2y})t^2 + c_{1y}t + (f_{10y} - f_{20y})).$$

Using the constraints set for z ($z_x = z_y$, and $v_{zx} = v_{zy}$) constraints can be found between $b_{1x}$, $b_{2x}$, $b_{1y}$, $b_{2y}$, $c_{1x}$, $c_{1y}$, $f_{10x}$, $f_{20x}$, $f_{10y}$, $f_{20y}$.

In order to render the equations more simple $f_{10x}$, $f_{20x}$ are chosen as: $f_{10x} = d_x$, and $f_{20x} = 0$ and $f_{10y} = d_y$, and $f_{20y} = 0$.

In this case the above constraints result in:

$$d_y = \frac{y - x}{f_{obj} M_y K_y} + \frac{M_x}{M_y} d_x.$$

A further constraint can be set by requiring that the velocity along z be constant with t, meaning that the t dependent terms in the expression of $v_z$ must have zero coefficients.

This puts the constraint to the b coefficients:

$$b_{1x} = \frac{(-1 + M_x)}{(1 + M_x)} b_{2x}.$$

Applying this to the formula of x (and y symmetrically), we get:

$$x = M_x K_x f_{obj} \left( \frac{-2b_{1x}}{M_x - 1} t^2 + c_{1x}t + d_{1x} \right)$$

and the velocity along x accordingly:

$$v_x = \left( \frac{-4b_{1x}}{M_x - 1} t + c_{1x} \right)$$

the expression of z:

$$z = \left( \frac{M_x f_{obj} c_{1x}(M_x + 1) - 2M_x b_{2x} t}{(M_x + 1)(M_x + 1)c_{1x}} \right).$$

To avoid t dependence of $v_x$ (and $t^2$ dependence of x) $b_{1x}$ can set as $b_{1x} = 0$. This immediately implies $b_{2x} = 0$ that would result in $v_{zx} = 0$, unless the magnification between the cells and the objective in the x-z plane is 1: $M_x = 1$.

If $b_{1x} = 0$ and $M_x = 1$ simultaneously, very simple formulas arise for the coordinates, since only the slope of the frequency in the second deflectors x 12' and y 22' must vary with time. For this both magnifications $M_x = M_y = 1$ should be constrained. This can be nearly satisfied with a setup involving long focal length (compared to the distances between the x and y deflectors 12, 12', 22, 22' and the deflector sizes I) lenses, or exactly satisfied with specially designed cylinder astigmatic lenses. In this simple case the coordinates are:

$$x = K_x f_{obj}(c_{1x}t + d_{1x}), \; y = K_y f_{obj}(c_{1y}t + d_{1y}),$$

$$z_x = \left( \frac{f_{obj}c_{1x} - 2b_{2x}t}{2c_{1x}} \right), z_y = \left( \frac{f_{obj}c_{1y} - 2b_{2y}t}{2c_{1y}} \right)$$

and the velocities:

$$v_x = c_{1x}, \; v_y = c_{1y}, \; v_z = f_{obj} \frac{b_{2x}}{2c_{1x}}$$

But from the z constraints $$(z_x = z_y)\frac{b_{2x}}{c_{1x}} = \frac{b_{2y}}{c_{1y}}, \text{ and } d_y = \frac{y - x}{f_{obj}K_y} + d_x$$

When wishing to scan along an arbitrary continuous trajectory the above equations allow to set $c_{1x}$, $c_{1y}$, and $d_y - d_x$ so as to determine the desired x, y coordinates, whereas the z coordinate can be set accordingly by setting $b_{2x}$, and $b_{2y}$, using $c_{1x}$ and $c_{1y}$ determined from x and y.

The above-described embodiments are intended only as illustrating examples and are not to be considered as limiting the invention. Various modifications will be apparent to a person skilled in the art without departing from the scope of protection determined by the attached claims.

The invention claimed is:

1. A method for scanning along a continuous scanning trajectory with an electromagnetic beam, comprising the steps of:
   providing a first pair of acousto-optic deflectors comprising first and second acousto-optic deflectors for deflecting the electromagnetic beam in a x-z plane;
   providing a second pair of acousto-optic deflectors comprising third and fourth acousto-optic deflectors for deflecting the electromagnetic beam in a y-z plane;
   passing the electromagnetic beam through said first and second pairs of acousto-optic deflectors while providing time dependent acoustic frequency chirps wherein each individual frequency chirp changes with time continuously and non-linearly in the first, second, third and fourth deflectors so as to cause a focal spot of the electromagnetic beam to move continuously along the scanning trajectory.

2. The method according to claim 1, characterized by said acoustic frequency chirps in the first and second deflectors of the first pair of deflectors satisfying the functions $f_{1x} = f_{10x} + a_{1x} \cdot t$ and $f_{2x} = f_{20x} + a_{2x} \cdot t$, respectively, wherein t is time, $f_{1x}$ is the function describing the acoustic frequency chirp in said first deflector, $f_{10x}$ is a constant frequency offset, $a_{1x}$ is a time dependent first slope, $f_{2x}$ is the function describing the acoustic frequency chirp in said second deflector, $f_{20x}$ is a constant frequency offset, $a_{2x}$ is a time dependent second slope, and setting a difference between said first and second slopes $a_{1x}$ and $a_{2x}$ so as to move the focal spot along the x axis with a first velocity ($v_x$); and providing acoustic frequency chirps in the third and fourth deflectors of the second pair of deflectors satisfying the functions $f_{1y}=f_{10y}+a_{1y}\cdot t$, and $f_{2y}=f_{20y}+a_{2y}\cdot t$, respectively, wherein t is time, $f_{1y}$ is the function describing the acoustic frequency chirp in said third deflector, $f_{10y}$ is a constant frequency offset, $a_{1y}$ is a time dependent third slope function, $f_{2y}$ is the function describing the acoustic frequency chirp in said fourth deflector, $f_{20y}$ is a constant frequency offset, $a_{2y}$ is a time dependent fourth slope, and continuously setting a difference between said third and fourth slopes so as to move the focal spot along the y axis with a second velocity ($v_y$) having regard to the first velocity ($v_x$) in order to move the focal spot continuously along the scanning trajectory.

3. A method for scanning along a continuous scanning trajectory with an electromagnetic beam, comprising the steps of:

providing a first pair of acousto-optic deflectors comprising first and second acousto-optic deflectors for deflecting the electromagnetic beam in a x-z plane;

providing a second pair of acousto-optic deflectors comprising third and fourth acousto-optic deflectors for deflecting the electromagnetic beam in a y-z plane;

passing the electromagnetic beam through said first and second pairs of acousto-optic deflectors; providing time dependent acoustic frequency sweeps that change with time continuously and non-linearly in the first and second deflectors of the first pair of deflectors satisfying the functions $f_{1x}=f_{10x}+a_{1x}\cdot t$ and $f_{2x}=f_{20x}+a_{2x}\cdot t$, respectively, wherein t is time, $f_{1x}$ is the function describing the acoustic frequency sweep in said first deflector, $f_{10x}$ is a constant frequency offset, $a_{1x}$ is a time dependent first slope, $f_{2x}$ is the function describing the acoustic frequency sweep in said second deflector, $f_{20x}$ is a constant frequency offset, $a_{2x}$ is a time dependent second slope, and setting a difference between said first and second slopes $a_{1x}$ and $a_{2x}$ so as to move a focal spot of the electromagnetic beam along the x axis with a first velocity ($v_x$); and providing time dependent acoustic frequency sweeps that change with time continuously and non-linearly in the third and fourth deflectors of the second pair of deflectors satisfying the functions $f_{1y}=f_{10y}+a_{1y}\cdot t$, and $f_{2y}=f_{20y}+a_{2y}\cdot t$, respectively, wherein t is time, $f_{1y}$ is the function describing the acoustic frequency sweep in said third deflector, $f_{10y}$ is a constant frequency offset, $a_{1y}$ is a time dependent third slope function, $f_{2y}$ is the function describing the acoustic frequency sweep in said fourth deflector, $f_{20y}$ is a constant frequency offset, $a_{2y}$ is a time dependent fourth slope, and continuously setting a difference between said third and fourth slopes so as to move the focal spot along the y axis with a second velocity ($v_y$) having regard to the first velocity ($v_x$) in order to move the focal spot continuously along the scanning trajectory; and setting a difference between said first and second slopes such that the first and second slopes in the first and second deflectors are shifted non-symmetrically, and setting a difference between said third and fourth slopes such that the third and fourth slopes in the third and fourth deflectors are shifted non-symmetrically so as to cause the focal spot to move along the z axis with a third velocity ($v_z$) having regard to the first and second velocity ($v_x$ and $v_y$) in order to move the focal spot continuously along the scanning trajectory.

4. The method according to claim 3, characterized by:

setting the first and second slopes in the first and second deflectors according to the function: $a_{1x}=b_{1x}t+c_{1x}$, and $a_{2x}$ $b_{2x}t+c_{2x}$ respectively, setting the third and fourth slopes in the third and fourth deflectors according to the function: $a_{1y}=b_{1y}t+c_{1y}$, and $a_{2y}$ $b_{2y}t+c_{2y}$ respectively, wherein $b_{1x}$, $b_{2x}$, $b_{1y}$, $b_{2y}$, $c_{1x}$, $c_{2x}$, $c_{1y}$, $c_{2y}$ are constants and choosing the value of b1x, b2x, b1y, b2y, c1x, c2x, c1y, c2y, $f_{10x}$, $f_{20x}$, $f_{10y}$, $f_{20y}$ such that the two deflector pairs produce the same z coordinates ($z=z_x=z_y$) and the same third velocities ($v_z=v_{zx}=v_{zy}$) for the focal spot of the electromagnetic beam.

5. The method according to claim 3, characterized by setting the differences between the slopes such that the first and second slopes are shifted so as to satisfy $K_{2x}(\lambda)a_{2x}+K_{1x}(\lambda)a_{1x}$=const, and the third and fourth slopes are shifted so as to satisfy $K_{2y}(\lambda)a_{2y}+K_{1y}(\lambda)a_{1y}$=const, wherein $\lambda$ is the optical wavelength of the electromagnetic beam and functions $K_{1x}(\lambda)$, $K_{2x}(\lambda)$, $K_{1y}(\lambda)$, $K_{2y}(\lambda)$ describe the dependence of a deflection angle of the electromagnetic beam on the acoustic frequency in the first, second, third and fourth deflector, respectively.

* * * * *

UNITED STATES PATENT AND TRADEMARK OFFICE
CERTIFICATE OF CORRECTION

PATENT NO. : 10,168,598 B2  
APPLICATION NO. : 14/368932  
DATED : January 1, 2019  
INVENTOR(S) : Balazs Rozsa et al.

Page 1 of 1

It is certified that error appears in the above-identified patent and that said Letters Patent is hereby corrected as shown below:

In the Specification

Column 7,  
Line 19, "$a_{1y}=b_{1y}t+c_{1y}$, and $a_{2y}t$ and $K_{1y}=K_{2y}=K_y$" should be -- $a_{1y}=b_{1y}t+c_{1y}$, and $a_{2y}=b_{2y}t$ and $K_{1y}=K_{2y}=K_y$ --.

In the Claims

Column 10,  
Line 28, "$a_{2x}\ b_{2x}t+c_{2x}$" should be -- $a_{2x}=b_{2x}t+c_{2x}$ --.  
Line 31, "$a_{2y}\ b_{2y}t+c_{2y}$" should be -- $a_{2y}=b_{2y}t+c_{2y}$ --.

Signed and Sealed this  
Thirtieth Day of April, 2019

Andrei Iancu  
*Director of the United States Patent and Trademark Office*